Patented July 11, 1933

1,918,011

UNITED STATES PATENT OFFICE

JAMES WARWICK BAMPFYLDE, OF LONDON, ENGLAND

MAKING OR REMELTING ALLOYS OF ALUMINIUM AND IRON

No Drawing. Application filed September 10, 1930, Serial No. 481,071, and in Great Britain October 21, 1929.

Considerable difficulty attends the manufacture of alloys and aluminium and iron or steel, and the casting of the molten alloy.

The iron is first melting in the crucible or furnace, which is lined with a basic material, generally magnesite, and the slag is removed. The required quantity of aluminium is then added in solid form to the molten iron. When the whole of the aluminium has been dissolved a solid dross is found floating on the surface of the metal, in particular at its junction with the lining. It is practically impossible to remove this solid dross so completely that when the metal is poured particles of it do not become entangled in the metal, producing faults in the ingots and castings and weaknesses in the finished products.

Another trouble is the rapidity with which the capacity of the lined crucible or furnace diminishes by "growth" of the lining. From this cause the number of charges which can be melted in the crucible or furnace before it is re-lined is very small, generally not more than two. This is the more important because the alloys in question are best made in an electrical induction furnace, so that the operation is on a comparatively small scale. Moreover, the growth of the lining means loss of transfer electrical efficiency in the furnace.

The same kind of trouble is caused by the formation of dross during the flow of the molten metal from a tun-dish or ladle, in casting the metal into ingot moulds or smaller moulds. In the tun-dish the discharge orifice grows smaller and a thick skull is formed. This can only be removed by destroying the tun-dish. So also in the ladle a thick skull is formed, greatly reducing the capacity of the ladle.

The present invention is based on the observation that fluorspar has quite a special effect in dissipating the dross which causes the foregoing troubles.

The invention consists in adding fluorspar during the melting operation, when an alloy of aluminium and iron is being produced or re-melted, or in adding fluorspar to the molten alloy when this being poured.

In the production of the alloy it is best to add fluorspar, preferably powdered, to the crucible or furnace immediately prior to, or together with the solid iron; when the latter is melted the slag is removed and a further addition of fluorspar is made just before adding the first pieces of aluminium; then smaller amounts are added while the rest of the aluminium is being introduced and until the charge is poured. These additions prevent the appearance of dross at the surface of the molten metal, and ensure that, when the furnace is energized, the metal is covered with at least a very thin film, showing interference colours, that is to say, a film which, when viewed at an angle to the surface of the molten metal, shows rainbow colors.

The addition of fluorspar may be continued during the pouring of the metal. Also fluorspar may be added to the tun-dish or ladle in the casting operations.

It has not been possible to ascertain what chemical and physical effect the fluorspar has in dissipating the dross, or preventing its formation. Certainly the effect is not the production of what is commonly called slag, because the slag formed initially by the melting of the iron has been removed prior to the addition of the aluminium and no further slag is formed after the addition of the aluminium and fluorspar.

The advantages of the use of fluorspar may be summarized as follows:—

(1) It increases by some 10-20 per cent, the amount of alloy obtained from a given weight of iron and aluminium.

(2) It allows repeated use of the crucible without re-lining it, the internal diameter of the lined crucible being controlled by the initial addition of fluorspar with the solid iron.

(3) It produces a cleaner metal.

(4) It allows use of a tun-dish having a small discharge hole, thereby diminishing splashing.

(5) It diminishes skulls in ladles and other foundry appliances.

As an example of the proportion of fluorspar that may be required, a normal operation conducted in an induction furnace of average size would be as follows:—

Place in the crucible 4–6 parts by weight of fluorspar and charge in 300 parts of iron bars; heat to melting, remove the slag and add 50 parts of aluminium and another 4 parts of fluorspar, in the manner described above, until the metal is poured. The melting of the iron generally occupies 45 minutes and the total time up to pouring may be 60 minutes.

In adding fluorspar to a tun-dish or ladle, the amount may be about 0.06 per cent. of the weight of the metal.

Strontium fluoride is to be regarded as the equivalent of fluorspar for the purpose of the invention.

I claim:

1. A process of making an alloy of aluminium and iron, comprising melting iron in the presence of fluorspar, removing the slag, and then adding aluminium and a further quantity of fluorspar.

2. A process of making an alloy of aluminium and iron, comprising melting iron and aluminium in the presence of fluorspar and adding fluorspar to the molten metal in such quantities that the molten surface continues to appear to be covered by a thin film which shows interference colours.

3. Process according to claim 1, characterized by the fact that fluorspar is added to a tun-dish or ladle containing the molten alloy.

4. A process of making an alloy of aluminium and iron wherein the latter constitutes at least seventy-five per cent. of the whole, comprising melting the iron in the presence of fluorspar, removing the slag, and incorporating the aluminium and a further quantity of fluorspar.

5. A process of making an alloy of aluminium and iron, comprising melting approximately 300 parts by weight of iron, adding approximately 50 parts by weight of aluminium, and then adding to the molten metal fluorspar in sufficient quantity to cause the appearnce on the surface of the molten metal of a thin film which shows interference colors.

In testimony whereof I have signed my name to this specification.

JAMES WARWICK BAMPFYLDE.